(12) United States Patent
Mori et al.

(10) Patent No.: US 10,738,673 B2
(45) Date of Patent: Aug. 11, 2020

(54) ELECTRICALLY HEATED CATALYTIC CONVERTER AND METHOD OF MANUFACTURING THE SAME

(71) Applicants: TOYOTA JIDOSHA KABUSHIKI KAISHA, Toyota-shi, Aichi-ken (JP); NGK INSULATORS, LTD., Nagoya, Aichi-prefecture (JP)

(72) Inventors: Rentaro Mori, Kasugai (JP); Yoshiyuki Kasai, Kasugai (JP); Yoshimasa Omiya, Nagoya (JP)

(73) Assignees: TOYOTA JIDOSHA KABUSHIKI KAISHA, Toyota-shi, Aichi-ken (JP); NGK INSULATORS, LTD., Nagoya, Aichi-prefecture (JP)

(*) Notice: Subject to any disclaimer, the term of this patent is extended or adjusted under 35 U.S.C. 154(b) by 584 days.

(21) Appl. No.: 15/499,278

(22) Filed: Apr. 27, 2017

(65) Prior Publication Data
US 2017/0314441 A1  Nov. 2, 2017

(30) Foreign Application Priority Data
May 2, 2016  (JP) .................... 2016-092642

(51) Int. Cl.
*F01N 3/20* (2006.01)
*H05B 3/02* (2006.01)
(Continued)

(52) U.S. Cl.
CPC ....... *F01N 3/2026* (2013.01); *B01D 53/9454* (2013.01); *B01J 23/42* (2013.01);
(Continued)

(58) Field of Classification Search
None
See application file for complete search history.

(56) References Cited

U.S. PATENT DOCUMENTS 9,273,582 B2  3/2016  Kikuchi et al.
2003/0121800 A1*  7/2003  Wahl .................. G01N 27/4074
205/780.5
(Continued)

FOREIGN PATENT DOCUMENTS

JP  05256816 A  10/1993
JP  2002107196 A  4/2002
(Continued)

*Primary Examiner* — Joseph M Pelham
(74) *Attorney, Agent, or Firm* — Sughrue Mion, PLLC

(57) ABSTRACT

Provided is an electrically heated catalytic converter including at least a conductive substrate and an electrode member that is fixed to the substrate, in which a protective film is formed on a surface of at least a portion of the electrode member. In the electrically heated catalytic converter, at least a portion of the protective film is formed of $Al_2O_3$, $SiO_2$, a composite material of $Al_2O_3$ and $SiO_2$, or a composite oxide including $Al_2O_3$, $SiO_2$, or a composite material of $Al_2O_3$ and $SiO_2$ as a major component, the protective film has an amorphous structure or a partially crystalline glass structure having a crystallization rate of 30 vol % or lower with respect to the entire portion of the protective film, and a thickness of the protective film is in a range of 100 nm to 2 μm.

9 Claims, 5 Drawing Sheets

(51) Int. Cl.
<table>
<tr><td>H05B 3/03</td><td>(2006.01)</td></tr>
<tr><td>H05B 3/08</td><td>(2006.01)</td></tr>
<tr><td>F01N 3/28</td><td>(2006.01)</td></tr>
<tr><td>C23C 18/12</td><td>(2006.01)</td></tr>
<tr><td>B01J 37/08</td><td>(2006.01)</td></tr>
<tr><td>B01J 37/03</td><td>(2006.01)</td></tr>
<tr><td>B01D 53/94</td><td>(2006.01)</td></tr>
<tr><td>B01J 23/42</td><td>(2006.01)</td></tr>
<tr><td>B01J 23/44</td><td>(2006.01)</td></tr>
<tr><td>B01J 23/46</td><td>(2006.01)</td></tr>
<tr><td>B01J 27/224</td><td>(2006.01)</td></tr>
<tr><td>B01J 35/00</td><td>(2006.01)</td></tr>
<tr><td>B01J 35/04</td><td>(2006.01)</td></tr>
<tr><td>B05D 3/02</td><td>(2006.01)</td></tr>
<tr><td>B05D 7/14</td><td>(2006.01)</td></tr>
<tr><td>H05B 3/00</td><td>(2006.01)</td></tr>
<tr><td>H05B 3/14</td><td>(2006.01)</td></tr>
</table>

(52) U.S. Cl.
CPC ............. *B01J 23/44* (2013.01); *B01J 23/464* (2013.01); *B01J 27/224* (2013.01); *B01J 35/0006* (2013.01); *B01J 35/0033* (2013.01); *B01J 35/04* (2013.01); *B01J 37/036* (2013.01); *B01J 37/08* (2013.01); *B05D 3/0254* (2013.01); *B05D 7/14* (2013.01); *C23C 18/122* (2013.01); *C23C 18/1212* (2013.01); *C23C 18/1254* (2013.01); *C23C 18/1275* (2013.01); *C23C 18/1295* (2013.01); *F01N 3/2828* (2013.01); *H05B 3/0014* (2013.01); *H05B 3/03* (2013.01); *H05B 3/08* (2013.01); *H05B 3/148* (2013.01); *B01D 2255/102* (2013.01); *B01D 2255/2092* (2013.01); *B01D 2255/407* (2013.01); *H05B 2203/024* (2013.01); *Y02T 10/22* (2013.01); *Y02T 10/26* (2013.01)

(56) References Cited

U.S. PATENT DOCUMENTS

<table>
<tr><td>2009/0301878 A1*</td><td>12/2009</td><td>Wang</td><td>G01N 33/0054<br>204/429</td></tr>
<tr><td>2014/0065060 A1*</td><td>3/2014</td><td>Gerlinger</td><td>C07F 15/0086<br>423/659</td></tr>
<tr><td>2015/0247436 A1</td><td>9/2015</td><td>Nakayama et al.</td><td></td></tr>
<tr><td>2016/0115842 A1*</td><td>4/2016</td><td>Mutsuda</td><td>F01N 3/2013<br>60/320</td></tr>
<tr><td>2017/0271651 A1*</td><td>9/2017</td><td>Behan</td><td>H01M 4/13</td></tr>
</table>

FOREIGN PATENT DOCUMENTS

<table>
<tr><td>JP</td><td>2002296221 A</td><td>10/2002</td></tr>
<tr><td>JP</td><td>2014062467 A</td><td>4/2014</td></tr>
<tr><td>JP</td><td>2014-105694 A</td><td>6/2014</td></tr>
<tr><td>WO</td><td>2007/059883 A1</td><td>5/2007</td></tr>
</table>

* cited by examiner

US 10,738,673 B2

ELECTRICALLY HEATED CATALYTIC CONVERTER AND METHOD OF MANUFACTURING THE SAME

INCORPORATION BY REFERENCE

The disclosure of Japanese Patent Application No. 2016-092642 filed on May 2, 2016 including the specification, drawings and abstract is incorporated herein by reference in its entirety.

BACKGROUND

1. Technical Field

The present disclosure relates to an electrically heated catalytic converter that is disposed in an exhaust system for exhaust gas, and a method of manufacturing the same.

2. Description of Related Art

In various industries, various efforts to reduce environmental impacts have been made on a global scale. In particular, in the automobile industry, the development of techniques has progressed for the spread of not only a gasoline engine vehicle having superior fuel efficiency but also a so-called eco-car such as a hybrid vehicle or an electric vehicle and for further improvement in the performance of the vehicles.

Incidentally, in an exhaust system for exhaust gas through which a vehicle engine and a muffler are connected to each other, an electrically heated catalytic converter (EHC) may be mounted which activates a catalyst to purify exhaust gas as soon as possible not only by purifying exhaust gas during a normal operation but also by electrically heating the catalyst during a cold period.

In this electrically heated catalytic converter, for example, a pair of electrodes are attached to a honeycomb catalyst that is disposed in an exhaust system for exhaust gas, the pair of electrodes are connected through an external circuit including a power supply, the honeycomb catalyst is heated by causing a current to flow through the electrodes, and the activity of the honeycomb catalyst is improved so as to detoxify the exhaust gas passing therethrough.

For example, Japanese Patent Application Publication No. 2014-105694 (JP 2014-105694 A) discloses an example of an electrically heated catalytic converter including: a ceramic substrate (support) on which a catalyst is supported; a pair of surface electrode films that extend in an axial direction of the substrate while facing each other on an outer circumferential surface of the substrate; a comb-shaped wiring through which electric power is supplied from the outside of the electrically heated catalytic converter to the surface electrode films; and a plurality of wiring fixing layers that fix the wiring to the surface electrode films. In the electrically heated catalytic converter, the substrate is electrically heated through the surface electrode films. The surface electrode films, the comb-shaped wiring, and the wiring fixing layers can be collectively referred to as "electrode member".

In order to protect the electrode member from an oxidizing atmosphere in an usage environment, a protective film formed of $Cr_2O_3$ or the like is formed on a surface of the electrode member, and the oxidation resistance temperature of such a protective film is lower than 1000° C.

On the other hand, the protective film of the electrode member constituting the electrically heated catalytic converter requires an oxidation resistance temperature of 1000° C. or higher, and the development of a new protective film alternative to the protective film formed of $Cr_2O_3$ or the like is an urgent issue. JP 2014-105694 A also discloses an electrically heated catalytic converter including a protective film formed of $Cr_2O_3$.

Here, the oxidation resistance temperature of a non-conductive material such as $Al_2O_3$ or $SiO_2$ alternative to $Cr_2O_3$ is 1000° C. or higher. However, since the atmosphere temperature where the oxidation reaction of Al or Si as a metallic raw material occurs is extremely high at 1200° C. or higher, film formation processing is necessary under a higher-temperature atmosphere than a protective film formed of $Cr_2O_3$ which is formed in a usage environment.

Therefore, the development of a technique capable of forming a protective film formed of $Al_2O_3$, $SiO_2$, or the like, which has a high oxidation resistance temperature, at as a low atmosphere temperature as possible is required.

SUMMARY

The disclosure provides: an electrically heated catalytic converter in which a protective film having excellent oxidation resistance at a high temperature of 1000° C. or higher is formed; and a method of manufacturing an electrically heated catalytic converter in which a protective film having a high oxidation resistance temperature of 1000° C. or higher can be formed at as a low atmosphere temperature as possible.

According to the disclosure, there is provided an electrically heated catalytic converter including at least a conductive substrate that includes a catalyst coating layer and an electrode member that is fixed to the substrate, in which a protective film is formed on a surface of at least a portion of the electrode member. The protective film is formed of i) $Al_2O_3$, ii) $SiO_2$, iii) a composite material of $Al_2O_3$ and $SiO_2$, or iv) a composite oxide including $Al_2O_3$, $SiO_2$, or a composite material of $Al_2O_3$ and $SiO_2$ as a major component, the protective film has a configuration in which the entire portion is formed of an amorphous structure or in which a partially crystalline glass structure having a crystallization rate of 30 vol % or lower with respect to the entire portion of the protective film is provided, and a thickness of the protective film is in a range of 100 nm to 2 μm.

In the electrically heated catalytic converter according to the disclosure, the protective film, which is formed on the surface of the electrode member, is formed of i) $Al_2O_3$, ii) $SiO_2$, iii) a composite material of $Al_2O_3$ and $SiO_2$, or iv) a composite oxide including $Al_2O_3$, $SiO_2$, or a composite material of $Al_2O_3$ and $SiO_2$ as a major component, and the protective film has a configuration in which the entire portion is formed of an amorphous structure or in which a partially crystalline glass structure having a crystallization rate of 30 vol % or lower with respect to the entire portion of the protective film is provided. As a result, the protective film has an oxidation resistance temperature of 1000° C. or higher. The protective film has an amorphous structure or a partially crystalline glass structure, and the thickness thereof is in a range of 100 nm to 2 μm. As a result, thermal stress is not likely to be generated, and thus the protective film is not likely to crack. The thickness of the protective film may be in a range of 100 nm to 1 μm.

Here, "electrode member" includes a surface electrode film that extends in an axial direction of a substrate on a surface of the substrate, a wiring through which electric power is supplied from the outside of the electrically heated catalytic converter to the surface electrode film, and a plurality of wiring fixing layers that fix the wiring to the surface electrode film. Typically, a pair of electrode members are disposed on a surface of a substrate and used.

The protective film has a configuration in which the entire portion is formed of an amorphous structure or in which a partially crystalline glass structure having a crystallization rate of 30 vol % or lower with respect to the entire portion of the protective film is provided. That is, the protective film has no crystal structure or a small amount of crystal structure. Therefore, the Young's modulus or thermal expansion coefficient of the protective film can be suppressed to be low, and thus the protective film has cracking resistance performance.

A protective film having a crystal structure may undergo a volume change at about a phase transition temperature (the phase transition temperature of $SiO_2$ crystals is about 280° C., and the phase transition temperature of $SiO_2$—$Al_2O_3$ crystals (mullite crystals) is about 970° C.) and may crack due to this volume change.

In a case where the thickness of the protective film is more than 2 μm, the protective film becomes excessively hard, and the protective film may crack due to a difference in thermal expansion between the substrate and the comb-shaped wiring. In a case where the thickness of the protective film is less than 100 nm, the gas barrier properties thereof deteriorate. Therefore, the thickness of the protective film is defined to be in a range of 100 nm to 2 μm.

Here, the conductive substrate may have electrical conductivity and heat radiation and be, for example, a conductive ceramic such as SiC. The conductive substrate is a porous member with a plurality of pores having, for example, a triangular shape, a quadrangular shape, or a hexagonal shape and is generally called a honeycomb structure. The catalyst coating layer in which a noble metal catalyst such as platinum or palladium is supported on an oxide support such as alumina is formed on surfaces of a plurality of cells of the substrate.

Examples of components of the electrically heated catalytic converter include: a substrate; for example, a pair of electrode members; a cable through which the pair of electrode members are connected; and an external circuit that is provided midway the cable and includes a power supply.

As a materials of the substrate and a material of the surface electrode film and the wiring fixing layer which constitute the electrode member, a ceramic material having lower thermal expansion than a Ni—Cr thermal spraying material described in JP 2014-105694 A can be used, and examples thereof include SiC, a composite material of SiC and Si, a composite material of SiC and $MoSi_2$, a composite material of $MoSi_2$ and Si, and a composite material (for example, boride or silicide) of SiC or the like and a conductive ceramic material.

According to the present inventors, it is verified that the protective film included in the electrically heated catalytic converter according to the disclosure has an oxidation resistance temperature of 1000° C. or higher, more specifically, 1000° C. to 1100° C. The electrode member may be a single member made of a metal or a ceramic or a composite member made of a metal and a ceramic, the electrode member is constituted with a surface electrode and a wiring fixing layer and that the electrode member may be a porous member in which a porosity of the surface electrode and the wiring fixing layer may 5% or higher. According to this configuration, the thermal expansion coefficients of the electrode member and the substrate are substantially the same, and thermal shock resistance can be increased when the electrically heated catalytic converter is actually used in an engine. The thermal expansion coefficients only has to be substantially the same to the extent that the catalytic converter is not damaged by thermal shock caused by a difference in thermal expansion coefficient when actually used in an engine.

According to the present disclosure, there is provided a method of manufacturing an electrically heated catalytic converter, the electrically heated catalytic converter including at least a conductive substrate that includes a catalyst coating layer and an electrode member that is fixed to the substrate, in which a protective film is formed on a surface of at least a portion of the electrode member. This method includes: preparing a sol-gel solution by adding any one of i) a nanomaterial of $Al_2O_3$, ii) a nanomaterial of $SiO_2$, iii) a nanomaterial of a composite material of $Al_2O_3$ and $SiO_2$, and iv) a nanomaterial of a composite oxide including $Al_2O_3$, $SiO_2$, or a composite material of $Al_2O_3$ and $SiO_2$ as a major component to a solvent; and manufacturing the electrically heated catalytic converter by applying the sol-gel solution to a surface of at least a portion of the electrode member, drying the sol-gel solution to form a coating film, and firing the coating film at a temperature of 500° C. or lower to form a protective film.

By using the sol-gel solution which is prepared by adding any one of i) a nanomaterial of $Al_2O_3$, ii) a nanomaterial of $SiO_2$, iii) a nanomaterial of a composite material of $Al_2O_3$ and $SiO_2$, and iv) a nanomaterial of a composite oxide including $Al_2O_3$, $SiO_2$, or a composite material of $Al_2O_3$ and $SiO_2$ as a major component to a solvent, a firing temperature of 500° C. or lower can be realized during the formation of the protective film. Here, examples of "nanomaterial" include nanoparticles, nanofibers, and inorganic polymers.

The present inventors found that, in a case where the firing temperature is about 700° C., the film-forming rate of the protective film is increased, and residual stress is generated in the formed protective film, which is not preferable.

In the method according to the disclosure, the firing temperature during the formation of the protective film is defined to be 500° C. or lower. In particular, by setting the temperature during firing to be in a relatively low temperature range of 100° C. to 200° C., firing may be performed at a slow heating rate.

By performing firing slowly in a temperature range of 100° C. to 200° C., the protective film can be formed as uniformly as possible.

In this way, a nanomaterial of $Al_2O_3$, a nanomaterial of $SiO_2$, or the like is used as a material of a protective film, and a sol-gel solution is used for a hydrolysis reaction to form the protective film. As a result, a dense protective film having excellent gas barrier properties against $O_2$ gas or the like can be formed.

As can be seen from the above description, in the electrically heated catalytic converter and the method of manufacturing the same according to the present disclosure, the protective film that is formed on a surface of the electrode member is formed of i) $Al_2O_3$, ii) $SiO_2$, iii) a composite material of $Al_2O_3$ and $SiO_2$, or iv) a composite oxide including $Al_2O_3$, $SiO_2$, or a composite material of $Al_2O_3$ and $SiO_2$ as a major component, the protective film has a configuration in which the entire portion is formed of an amorphous structure or a partially crystalline glass structure having a crystallization rate of 30 vol % or lower with respect to the entire portion of the protective film is provided, and a thickness of the protective film is in a range of 100 nm to 2 μm. As a result, the protective film can be formed at a firing temperature of 500° C. or lower, and the electrically heated catalytic converter including the protective film can be provided which has an oxidation resistance temperature of 1000° C. or higher and is not likely to crack and in which thermal stress is not likely to be generated.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of an electrically heated catalytic converter according to the present disclosure and a method of manufacturing the same will be described with reference to the drawings.

(Embodiment of Electrically Heated Catalytic Converter and Method of Manufacturing the Same)

Figure 1:
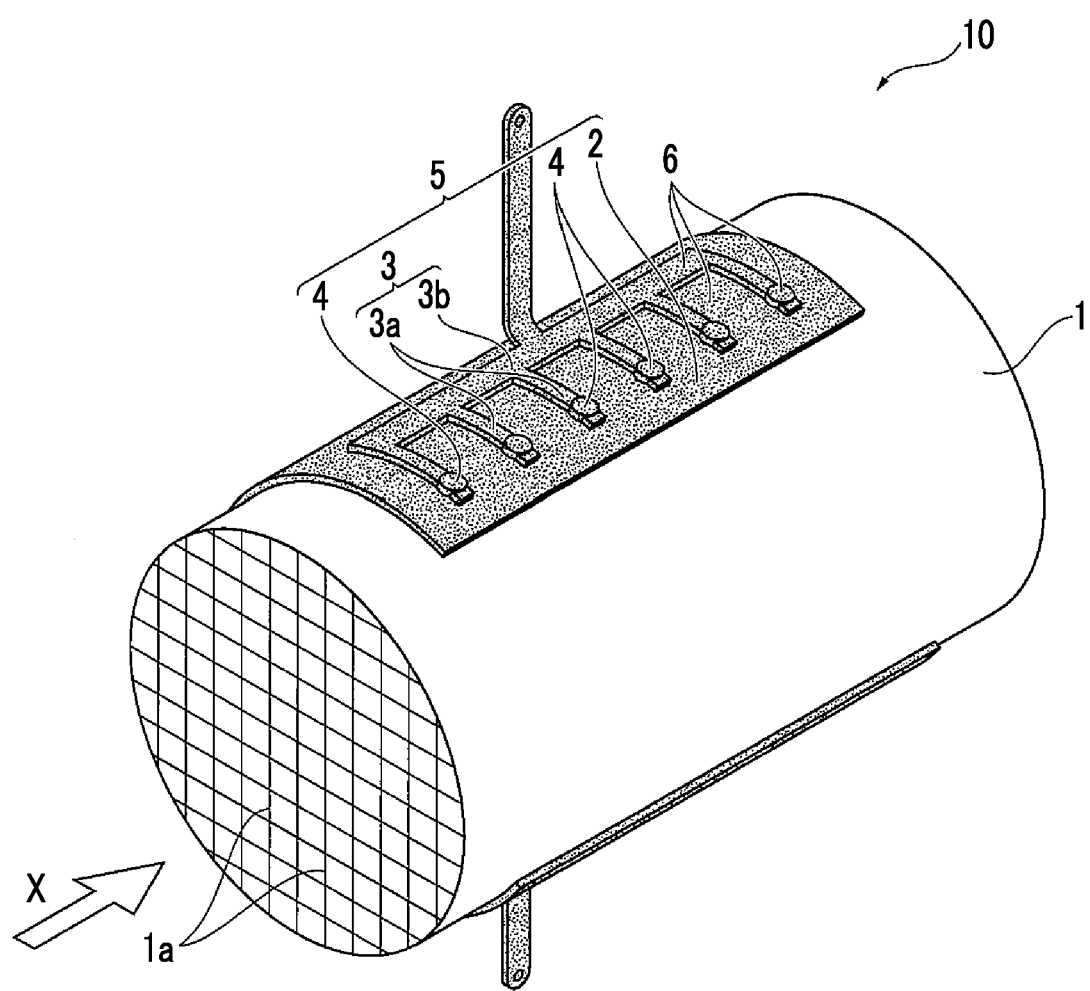
FIG. 1 is a schematic diagram showing an embodiment of an electrically heated catalytic converter (EHC) according to the disclosure.

FIG. 1 is a schematic diagram showing an embodiment of an electrically heated catalytic converter (EHC) according to the disclosure. An electrically heated catalytic converter 10 shown in the drawing is incorporated into an exhaust system for exhaust gas. Specifically, in the exhaust system, an engine (not shown), the electrically heated catalytic converter (EHC) 10, a three-way catalytic converter (not shown), a sub muffler (not shown), and a main muffler (not shown) are disposed in this order and are connected to each other through a system pipe. When the engine starts, a noble metal catalyst constituting the electrically heated catalytic converter 10 is heated to a predetermined temperature as soon as possible, exhaust gas flowing from the engine is purified by the noble metal catalyst, and a portion of the exhaust gas which is not purified by the electrically heated catalytic converter 10 is purified by the three way catalyst purifier positioned downstream of the electrically heated catalytic converter 10.

The electrically heated catalytic converter 10 is fixed through an external metal pipe (metal case; not shown) and a mat (holder; not shown) which is provided in a hollow portion of the external pipe, and is configured overall to include: a substrate having a honeycomb structure in which a catalyst coating layer (not shown) is provided on surfaces of cell walls 1a; a cable (not shown) through which a pair of electrode members 5 disposed on a surface of the substrate 1 are connected to each other; and an external circuit that is provided midway the cable and includes a power supply (not shown). Among the pair of electrode members 5, one electrode member is connected to a positive pole, and the other electrode member is connected to a negative pole. The substrate 1 is electrically heated by supplying a current thereto through the electrode members 5.

Each of the electrode members 5 includes: a surface electrode film 2 that is disposed on a surface of the substrate 1; a comb-shaped wiring 3 that is disposed on a surface of the surface electrode film 2; and wiring fixing layers 4 to which a plurality of first wirings 3a, which are included in the comb-shaped wiring 3 and extend in a circumferential direction of the substrate 1, are fixed.

The comb-shaped wiring 3 includes: a second wiring 3b that extends in a longitudinal direction of the substrate 1; and the plurality of first wirings 3a that are branched from the second wiring 3b and extend in the circumferential direction of the substrate 1. The first wirings 3a and the second wiring 3b are electrically connected to the surface electrode film 2.

In a case where the power supply is turned on during an engine start, a current is supplied to the pair of electrode members 5 positioned at the center of the substrate 1, a path extending along a diameter of a section of the substrate 1 and a path linearly extending in a section of the substrate 1 through the surface electrode film 2 are formed. In this way, due to a current diffusion function of the surface electrode film 2 constituting the electrode member 5, a current can be supplied to the entire portion of substrate 1 as uniformly as possible, and the diffusion and rectification of an equal amount of current can be realized.

In the substrate 1, an exhaust gas passage having a honeycomb structure which includes a plurality of cell walls 1a is formed, and a catalyst coating layer (not shown) is formed on the cell walls 1a. The catalyst coating layer is formed by causing a platinum group element such as palladium (Pd), rhodium (Rh), or platinum (Pt) or a platinum group element compound to be supported on an oxide such as alumina ($Al_2O_3$) or causing another noble metal or a compound thereof to be supported on alumina or a ceria-zirconia ($CeO_2$—$ZrO_2$) composite oxide, adjusting this noble metal catalyst with alumina sol or water to prepare a slurry, and applying the slurry to the skeleton of the substrate using an impregnation method, an ion exchange method, a sol-gel method, a wash coating method, or the like.

Exhaust gas flowing down (X direction) from the upstream side of the exhaust system for exhaust gas is purified by the activity of the noble metal catalyst while flowing through the exhaust gas passage including the plurality of cell walls 1a, and the purified exhaust gas flows from the electrically heated catalytic converter 10 to the downstream side of the exhaust system.

First, the substrate 1, and the surface electrode film 2 and the wiring fixing layers 4 which constitute the electrode member 5 are formed of a metal material or a ceramic material. The substrate 1 can be formed of, for example, SiC, a composite material of SiC and Si, or a composite material of SiC and $MoSi_2$. The surface electrode film 2 and the wiring fixing layers 4 which constitute the electrode member 5 can be formed of a thermal spraying material such as Ni—Cr, CrB—Si, $MoSi_2$—Si, or $TiB_2$—Si.

A protective film 6 is formed on a surface of the electrode member 5. The surface which the protective film 6 is formed includes an area corresponding to a portion where the electrode member 5 is in contact with the substrate 1. The protective film 6 is formed of i) $Al_2O_3$, ii) $SiO_2$, iii) a composite material of $Al_2O_3$ and $SiO_2$, or iv) a composite oxide including $Al_2O_3$, $SiO_2$, or a composite material of $Al_2O_3$ and $SiO_2$ as a major component. The protective film 6 has a configuration in which the entire portion is formed of an amorphous structure or in which a partially crystalline glass structure having a crystallization rate of 30 vol % or lower with respect to the entire portion of the protective film is provided. A thickness of the protective film is in a range of 100 nm to 2 μm.

The protective film 6 has a configuration in which the entire portion is formed of an amorphous structure or in which a partially crystalline glass structure having a crystallization rate of 30 vol % or lower with respect to the entire portion of the protective film is provided. That is, the protective film 6 has no crystal structure or a small amount of crystal structure. Therefore, the Young's modulus or thermal expansion coefficient of the protective film 6 can be suppressed to be low, and thus the protective film 6 has cracking resistance performance.

Further, by setting the thickness of the protective film 6 to be in a range of 100 nm to 2 μm, thermal stress is not likely to be generated, and thus the protective film 6 is not likely to crack. It is preferable that the thickness of the protective film 6 is equal to or less than 1 μm to prevent the protective film 6 from cracking.

Next, the method of manufacturing the electrically heated catalytic converter 10 will be described focusing on a method of forming the protective film 6.

First, a sol-gel solution is prepared by adding any one of i) a nanomaterial of $Al_2O_3$, ii) a nanomaterial of $SiO_2$, iii) a nanomaterial of a composite material of $Al_2O_3$ and $SiO_2$, and iv) a nanomaterial of a composite oxide including $Al_2O_3$, $SiO_2$, or a composite material of $Al_2O_3$ and $SiO_2$ as a major component to a solvent including water and alcohol (first step).

Next, the sol-gel solution is applied to a surface of the electrode member 5 and is dried to form a coating film through a chemical reaction such as hydrolysis or condensation polymerization. Next, the coating film is fired at a temperature of 500° C. or lower to remove the solvent remaining therein and to promote densification, thereby the forming the protective film 6. As a result, the electrically heated catalytic converter 10 is manufactured (second step).

In this way, by using the sol-gel solution which is prepared by adding any one of i) a nanomaterial of $Al_2O_3$, ii) a nanomaterial of $SiO_2$, iii) a nanomaterial of a composite material of $Al_2O_3$ and $SiO_2$, and iv) a nanomaterial of a composite oxide including $Al_2O_3$, $SiO_2$, or a composite material of $Al_2O_3$ and $SiO_2$ as a major component to a solvent, the firing temperature during the formation of the protective film 6 can be made to be 500° C. or lower.

Regarding the firing temperature of 500° C. or lower, it is preferable that the firing temperature is in a range of 100° C. to 200° C., which is lower than 500° C., because firing can be performed at a slow heating rate such that the protective film 6 can be formed as uniformly as possible.

Using this manufacturing method, the electrically heated catalytic converter 10 which includes the protective film 6 having an oxidation resistance temperature of 1000° C. or higher can be manufactured at as a low atmosphere temperature as possible which is 500° C. or lower.

(Oxidative Degradation Test and Results Thereof)

Figure 2:
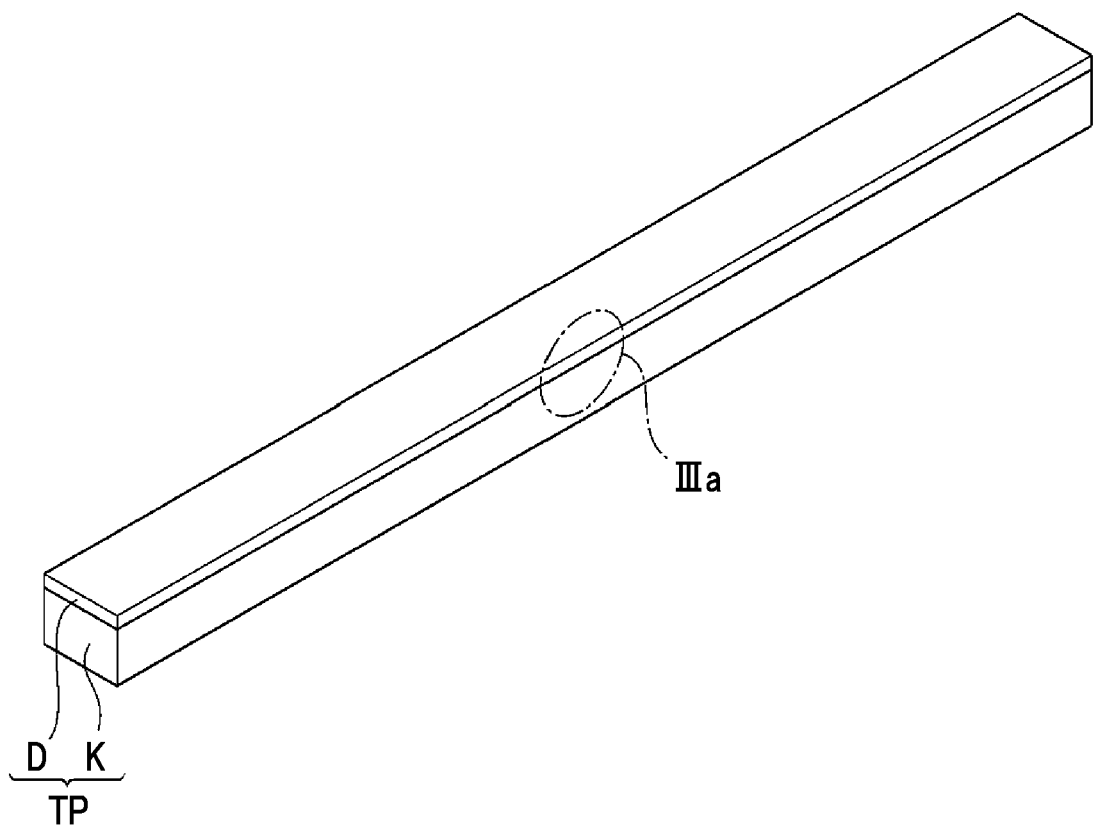
FIG. 2 is a schematic diagram showing a specimen.

The present inventors performed an experiment for verifying a relationship between oxidative degradation and whether or not the protective film was formed. Specifically, as shown in FIG. 2, an electrode terminal D (thickness: 50 μm or less) formed of a Ni—Cr thermal spraying material was formed on a surface of a porous substrate K formed of SiC/Si to prepare a specimen TP. A porosity of the wiring fixing layer of the specimen TP was obtained based on the image analysis of the sectional image of the specimen TP.

The obtained porosity was 14% or higher. One of the following two protective films was formed on a surface of the electrode terminal D.

In Example 1, a protective film formed of $SiO_2$ (amorphous silica) was formed. Regarding a method of forming the protective film, perhydropolysilazane (PHPS) as a precursor of an inorganic polymer was applied to a surface of the electrode terminal using a dipping method in a reduced-pressure atmosphere, was dried in air at 400° C. for 1 hour, and was fired in a $N_2$ gas atmosphere at 500° C. for 1 hour. The thickness of the protective film can be controlled by adjusting a diluted concentration of PHPS and firing conditions.

On the other hand, in Example 2, a protective film formed of $Al_2O_3$ (amorphous alumina) was formed. Regarding a method of forming the protective film, an $Al_2O_3$ sol was applied to a surface of the electrode terminal using a dipping method in a reduced-pressure atmosphere and was fired in air at 200° C. for 2 hours. The thickness of the protective film can be controlled by adjusting a diluted concentration of the $Al_2O_3$ sol and firing conditions. As a comparative example to Examples 1 and 2, a specimen including no protective film was prepared.

Regarding a test method, each of the specimens was treated in air (aging treatment) at 1000° C. for 24 hours to undergo oxidative degradation, and then the volume resistivity thereof was measured.

Figure 3A:
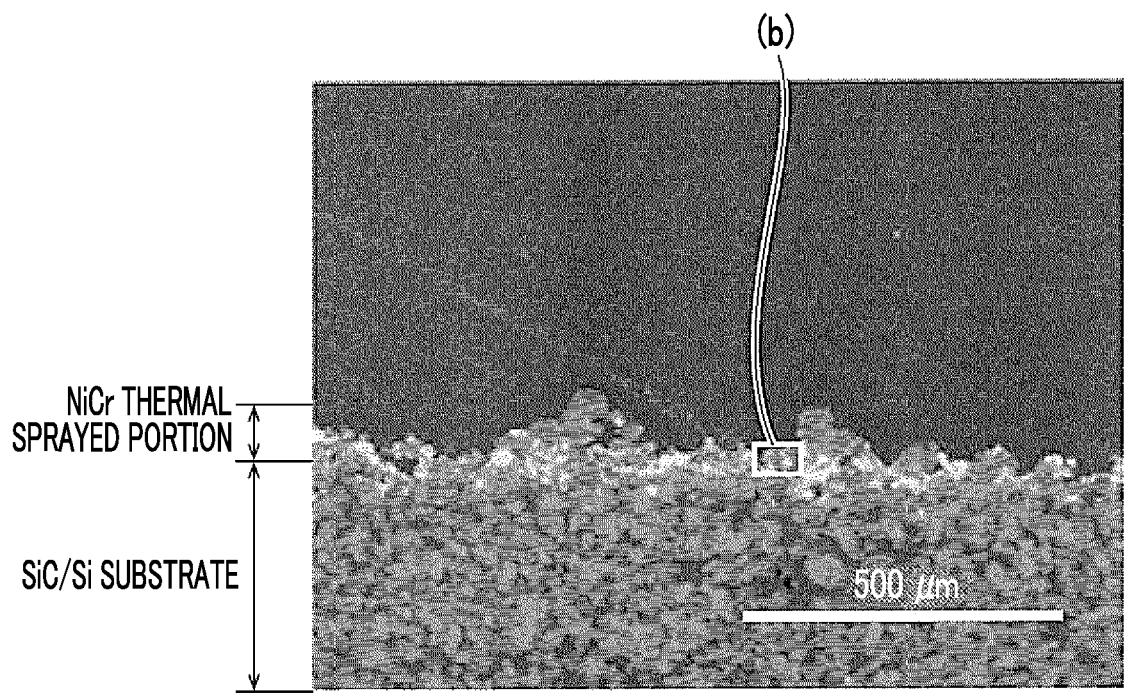
FIG. 3A is an SEM image showing a portion IIIa of FIG. 2.
Figure 3B:
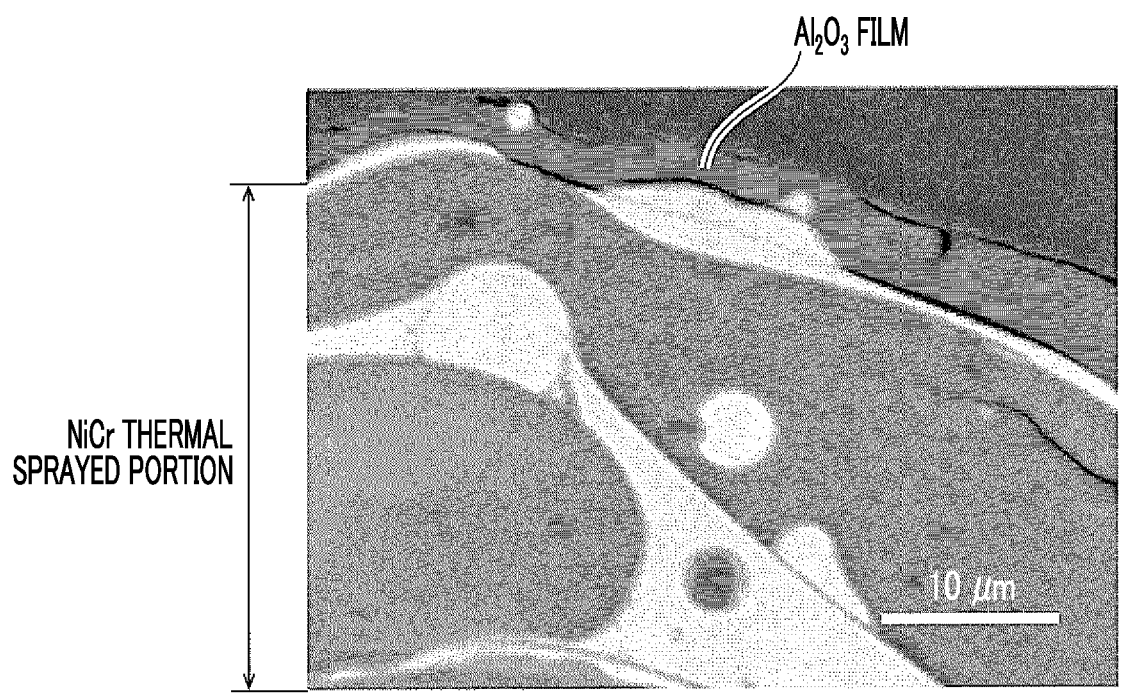
FIG. 3B is an SEM image showing an enlarged view of a portion b of FIG. 3A.

The specimen TP shown in FIG. 2 is coated with the protective film formed of $Al_2O_3$ (amorphous alumina) according to Example 2. FIG. 3A is an SEM image showing a portion Ma of the specimen TP covered with the protective film formed of $Al_2O_3$, and FIG. 3B is an SEM image showing an enlarged view of a portion b of FIG. 3A. It can be seen from FIG. 3B that surfaces of primary particles were coated with the $Al_2O_3$ film.

Figure 4:
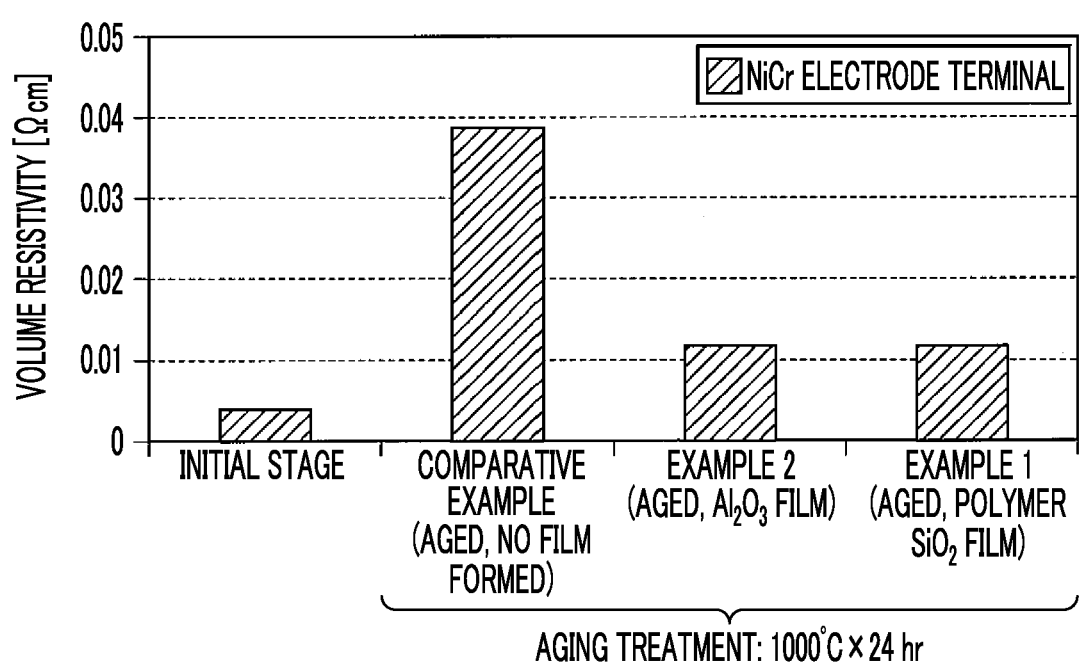
FIG. 4 is a graph showing the results of an oxidative degradation test.

FIG. 4 shows the results of the oxidative degradation test. It can be seen from FIG. 4 that, in Comparative Example, an increase in the volume resistivity caused by the oxidative degradation was significantly large compared to the initial state.

On the other hand, it can be seen that, in Examples 1 and 2, an increase in the volume resistivity caused by the oxidative degradation was extremely small compared to the initial state.

It can be seen from the experiment that, by forming the protective film formed of amorphous $Al_2O_3$ or amorphous $SiO_2$ on the surface of the electrode terminal, a change in the volume resistivity is suppressed and the oxidation resistance is improved.

Figure 5A:
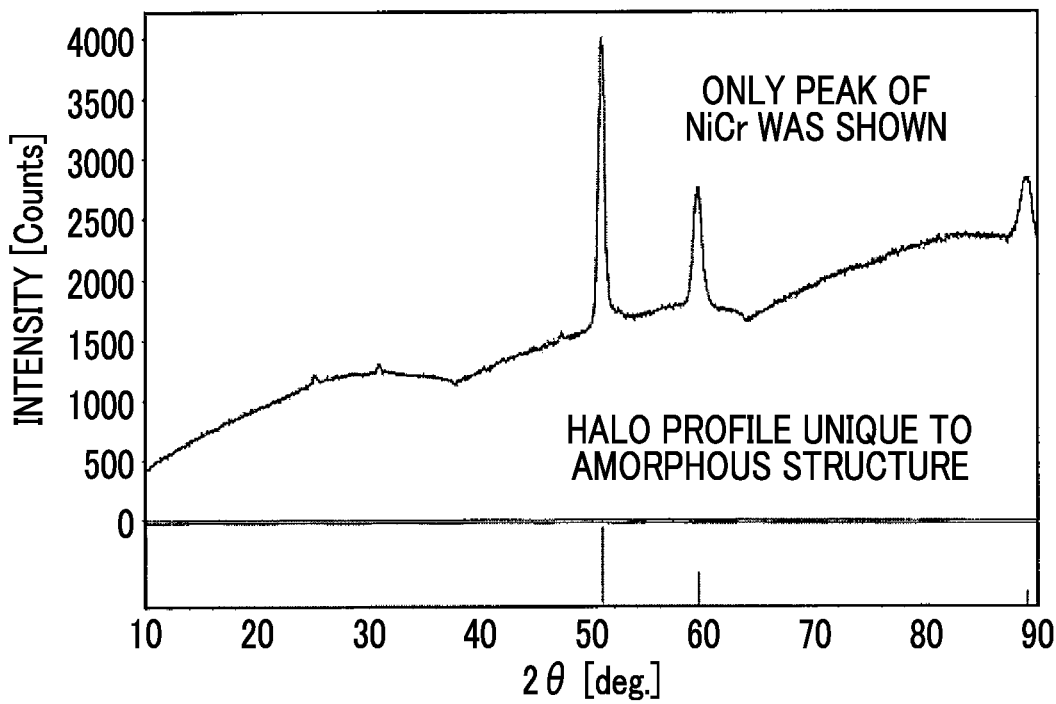
FIG. 5A is a graph showing an XRD profile of an $Al_2O_3$ film.
Figure 5B:
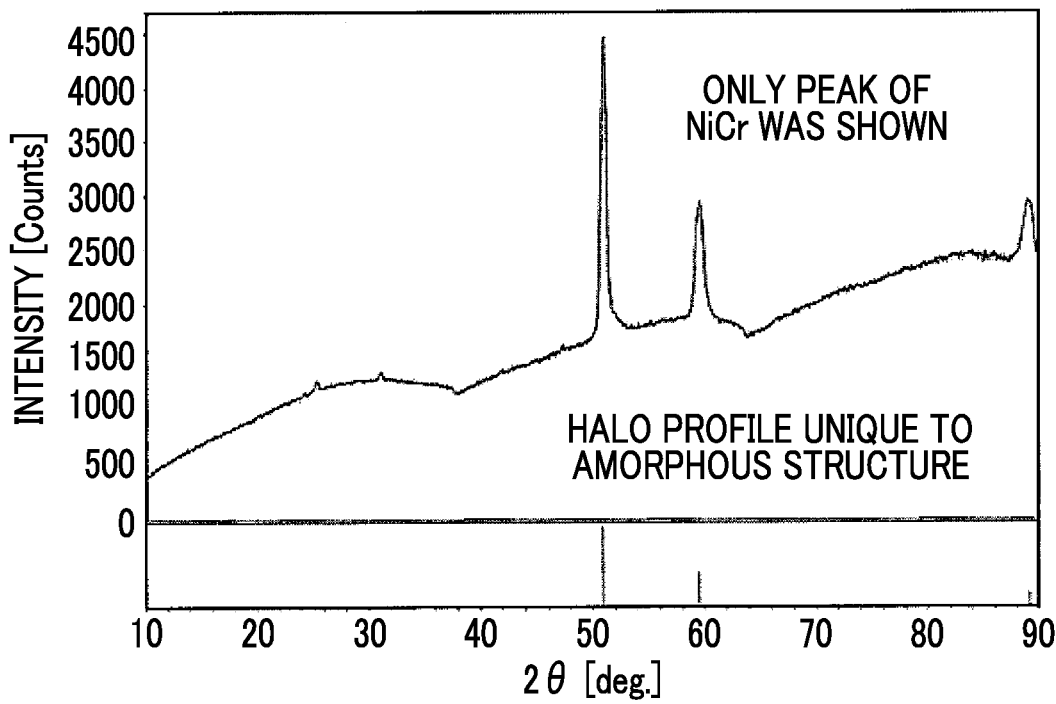
FIG. 5B is a graph showing an XRD profile of a $SiO_2$ film.

FIG. 5A shows an XRD profile of the $Al_2O_3$ film, and FIG. 5B shows an XRD profile of the $SiO_2$ film.

In FIGS. 5A and 5B, a peak derived from crystallinity is not shown, and thus it can be seen that the films have an amorphous structure.

Hereinabove, the embodiments of the disclosure have been described with reference to the drawings, but specific configurations thereof are not particularly limited to the above-described embodiments. Within a range not departing from the scope of the disclosure, design changes and the like can be made and are embraced in the disclosure.

What is claimed is:
1. An electrically heated catalytic converter comprising:
   a conductive substrate that includes a catalyst coating layer;
   an electrode member that is fixed to the substrate; and
   a protective film that is provided on a surface of at least a portion of the electrode member, wherein the protective film is formed of i) $Al_2O_3$, ii) $SiO_2$, iii) a composite material of $Al_2O_3$ and $SiO_2$, or iv) a composite oxide including $Al_2O_3$, $SiO_2$, or a composite material of $Al_2O_3$ and $SiO_2$ as a major component, the protective film has a configuration in which an entire portion is formed of an amorphous structure or in which a partially crystalline glass structure having a crystallization rate of 30 vol % or lower with respect to the entire portion of the protective film is provided, and a thickness of the protective film is in a range of 100 nm to 2 μm.

2. The electrically heated catalytic converter according to claim 1, wherein the conductive substrate is a conductive ceramic including SiC as a major component.

3. The electrically heated catalytic converter according to claim 1, wherein the electrode member is a single member made of a metal or a ceramic or a composite member made of a metal and a ceramic, the electrode member is constituted with a surface electrode and a wiring fixing layer, and a porosity of the surface electrode and the wiring fixing layer is 5% or higher.

4. A method of manufacturing an electrically heated catalytic converter, the electrically heated catalytic converter including at least a conductive substrate that includes a catalyst coating layer and an electrode member that is fixed to the substrate, in which a protective film is formed on a surface of at least a portion of the electrode member, and the method comprising:

preparing a sol-gel solution by adding any one of i) $Al_2O_3$, ii) $SiO_2$, iii) a composite material of $Al_2O_3$ and $SiO_2$, and iv) a composite oxide including $Al_2O_3$, $SiO_2$, or a composite material of $Al_2O_3$ and $SiO_2$ as a major component to a solvent; and manufacturing the electrically heated catalytic converter by applying the sol-gel solution to the surface of at least the portion of the electrode member, drying the sol-gel solution to form a coating film, and firing the coating film at a temperature of 500° C. or lower to form the protective film.

5. The method according to claim 4, wherein the conductive substrate is a conductive ceramic including SiC as a major component.

6. The method according to claim 4, wherein the electrode member is a single member made of a metal or a ceramic or a composite member made of a metal and a ceramic, and the electrode member is constituted with a surface electrode and a wiring fixing layer the electrode member is a porous member in which a porosity of the surface electrode and the wiring fixing layer is 5% or higher.

7. The method according to claim 4, wherein the sol-gel solution is applied to the surface of at least the portion of the electrode member and is dried to form the coating film, and the coating film is fired at a temperature of 100° C. to 200° C. to form the protective film.

8. The method according to claim 4, wherein a thickness of the protective film is in a range of 100 nm to 2 μm.

9. The method according to claim 4, wherein the protective film has a configuration in which an entire portion is formed of an amorphous structure or in which a partially crystalline glass structure having a crystallization rate of 30 vol % or lower with respect to the entire portion of the protective film is provided.

* * * * *